Patented Aug. 11, 1936

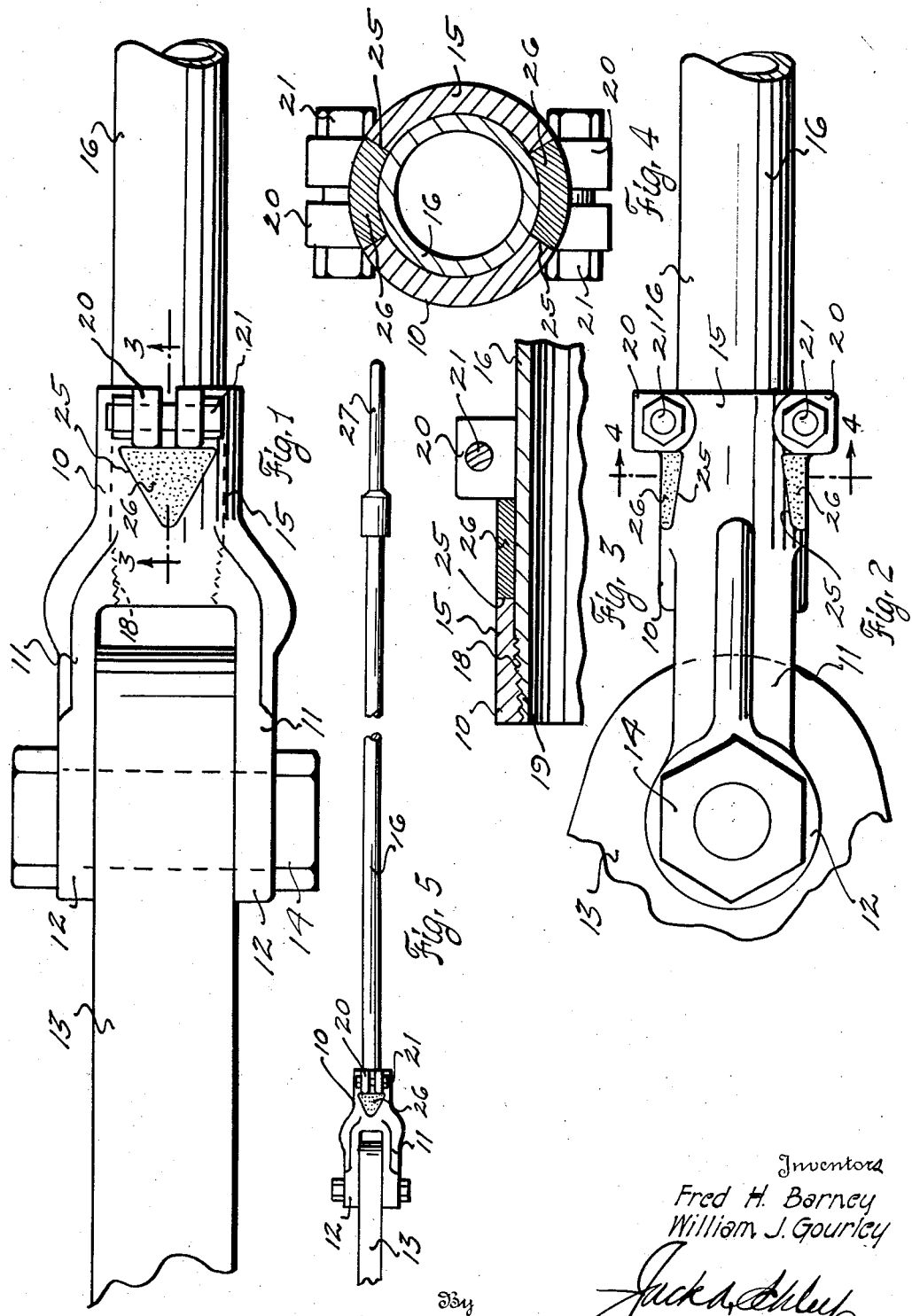

2,050,553

UNITED STATES PATENT OFFICE 2,050,553

PITMAN YOKE

Fred H. Barney and William J. Gourley, Fort Worth, Tex.

Application August 24, 1934, Serial No. 741,293

3 Claims. (Cl. 287—20)

This invention relates to new and useful improvements in pitman yokes.

This invention has to do with pitmans, such as are used in well pumping powers. Such pitmans are usually pivoted to the eccentric ring of the pumping power by a yoke. Considerable trouble has resulted because the pitman now in common use breaks where the threads on its end screw into the yoke. This is due to the vibration, stresses and sudden loads to which the pitman is subjected.

One object of the invention is to provide an improved yoke for well pumping powers, so arranged that the pitman is rigidly held therein and is less likely to break as the point of connection with said yoke or adjacent thereto.

A particular object of the invention is to provide a yoke so constructed that the end of the pitman which is secured in the yoke is more adequately fastened therein, as well as supported and braced, against the whipping, stresses and vibrations to which the pitman is subjected, and the tendency of the pitman to become loose in the yoke or break off therefrom is reduced to a minimum.

Another object of the invention is to provide a yoke having openings therein through which the pitman may be welded to the yoke and more securely fastened therein, whereby an additional means of fastening the pitman in the yoke is provided, thus making for a more rigid and substantial connection between the yoke and the pitman; also provide for a more secure fastening.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a side elevation of a yoke constructed in accordance with the invention and mounted on a pitman and connected to the eccentric ring of a pumping power, Figure 2 is a plan view of the same, Figure 3 is a longitudinal vertical sectional view taken on the line 3—3 of Figure 1, Figure 4 is a transverse vertical sectional view taken on the line 4—4 of Figure 2, and Figure 5 is a side elevation of the yoke connected to a power unit and mounted on a pitman.

In the drawing the numeral 10 designates a yoke comprising arms 11 provided with ears 12 on their outer ends. The eccentric ring 13 of a pumping power is received between the arms 11. The usual pivot pin 14 connects the ring and the ears and forms a pivotal connection.

The other end of the yoke is provided with an elongated clamping sleeve 15, which is split the major portion of its length. The yoke is provided with an internally screw-threaded socket 18 shaped to receive the tapered screw-threaded end 19 of a tubular pitman 16. When the yoke is screwed onto the pitman, the end 19 is securely fastened in the socket and the shank of the pitman telescopes the sleeve 15.

The outer end of the sleeve is provided with radially extending diametrically opposite ears 20 having bolts 21 extending therethrough. It will be seen that this arrangement constitutes a clamp on the outer end of the sleeve. It is pointed out that when the clamp is fastened it will hold the pitman and the yoke substantially rigid, whereby the shank of the pitman in or adjacent the yoke is reinforced and braced and is less liable to break, particularly at the base of the threads.

By clamping the pitman at a short distance from the threaded portion, as shown in the drawing, the stress is taken off of the threaded portion and the tendency of the shank to work or breathe is prevented.

As additional means for holding the pitman in the yoke, slots or apertures 25 are provided in the sleeve 15 adjacent the ears 20. The slots are preferably triangular in shape and have their base lines abutting the base of the ears, but it is pointed out that the particular shape and position of the slots is subject to variation.

The slots 25 may be filled with welding or other suitable metal 26, whereby the yoke is further secured in the sleeve. The slots are of a sufficient size to provide an ample weld so that the fastening is made rigid and the advantages and benefits of an integral structure are had. It is obvious that the weld provides an additional fastening means to the screw-threads and clamp, and greatly reinforces the shank of the pitman as it entirely eliminates any possible movement of said shank within the sleeve.

The other end of the pitman is provided with the usual stirrup 27 which is connected with the well rod line (not shown).

In mounting and using the device, the yoke 10 is screwed onto the threaded end 19 of the pitman 16. The bolts 21 are tightened to clamp the pitman within the sleeve 15. The arms 11 of said yoke are pivoted on the pin 14 which passes through said arms and the eccentric ring 13 of the pumping power.

The extension of the sleeve so that its outer end engages the shank of the pitman a short distance from the threads 19, as shown, will remove any stress from the threads, and the strain on the shank of the pitman near the threads is relieved. The end of the pitman, being securely supported and braced in the sleeve, is held against the whipping and vibration of the rod line, whereby danger of the threaded end of the pitman breaking is greatly reduced.

The slots 25 in the sleeve are provided so that a weld 26 may be made to further reinforce the pitman within the yoke. It is pointed out that in some cases, the screw threads and clamps are sufficient to rigidly hold the pitman in place and in such cases, it would be unnecessary to weld through the slots.

The description which has been given recites more or less detail of a particular embodiment of the invention, which is set forth as new and useful; however, we desire it understood that the invention is not limited to such exact details of construction, because it is manifest that changes and modifications may be made, within the scope of the appended claims, without departing from the spirit of the invention.

What we claim and desire to secure by Letters Patent is:

1. The combination with a pitman having a screw-threaded pin at one end of a yoke including, an elongated sleeve having arms extending from one end and having a bore extending therethrough, the end of the bore adjacent the arms being screw-threaded, whereby a threaded socket is formed, the remainder of the bore being smooth and free from screw threads, the sleeve being split at the end opposite the threaded socket, said split being comparatively short so as not to extend to said socket, the pitman engaging in the bore of said sleeve and having its pin screwed into the socket thereof, means for clamping the split end of the sleeve around the portion of the pitman contiguous to the pin, the smooth end of the bore having openings exposing said pitman and welding metal inserted in said openings and welded to the pitman, whereby the sleeve and pitman are fastened together.

2. The combination with a pitman having a screw-threaded pin at one end of a yoke including, an elongated sleeve having arms extending from one end and having a bore extending therethrough, the end of the bore adjacent the arms being screw-threaded, whereby a threaded socket is formed, the remainder of the bore being smooth and free from screw threads, the sleeve being split at the end opposite the threaded socket, said split extending inwardly a short distance along the smooth portion of the bore, the end of the pitman extending through the smooth portion of the bore and having its pin screwed into the socket thereof, means for clamping the split end of the sleeve around the pitman passing therethrough, the sleeve having openings located between the inner end of the threaded socket and the split therein, whereby a portion of the pitman contiguous to the pin is exposed, and welding metal inserted in said openings and welded to the pitman to securely fasten said pitman and sleeve together.

3. The combination with a pitman having a screw-threaded pin at one end of a yoke including, an elongated sleeve having arms extending from one end and having a bore extending therethrough, the end of the bore adjacent the arms being screw-threaded, whereby a threaded socket is formed, the remainder of the bore being smooth and free from screw threads, the sleeve being split at the end opposite the threaded socket, said split being comparatively short so as not to extend to said socket, the pitman engaging in the bore of said sleeve and having its pin screwed into the socket thereof, means for clamping the split end of the sleeve around the portion of the pitman contiguous to the pin, the smooth end of the bore being provided with diametrically opposite openings whereby areas of the surface of the pitman are exposed, and metal welded in the openings of the sleeve onto the surface of the pitman to fasten said sleeve and pitman together, the openings being of a comparatively large size so as to accommodate sufficient welding metal to prevent rotation of the pitman within the sleeve without embedding said metal in the surface of the sleeve.

FRED H. BARNEY.
WILLIAM J. GOURLEY.